United States Patent [19]
Blow et al.

[11] Patent Number: 5,301,171
[45] Date of Patent: Apr. 5, 1994

[54] CROSS-MONITORED PAIR OF CLOCKS FOR PROCESSOR FAIL-SAFE OPERATION

[75] Inventors: Brian A. Blow, Maple Grove; Mark E. Wright, Minneapolis, both of Minn.

[73] Assignee: Honeywell Inc., Minneapolis, Minn.

[21] Appl. No.: 70,146

[22] Filed: Jun. 1, 1993

[51] Int. Cl.⁵ .................... G04C 11/00; H03K 3/00
[52] U.S. Cl. .................... 368/46; 368/156; 328/63; 331/55
[58] Field of Search ........... 368/10, 120, 155-156, 368/200-202; 331/46, 49, 50, 55, 56; 364/569; 328/59-63

[56] References Cited

U.S. PATENT DOCUMENTS

| 4,156,200 | 5/1979 | Gomez | 328/61 |
| 4,254,492 | 3/1981 | McDermott | 368/119 |
| 4,449,830 | 5/1984 | Bulgier | 368/119 |
| 4,707,142 | 11/1987 | Baker et al. | 368/46 |
| 5,040,158 | 8/1991 | Lee et al. | 368/10 |

Primary Examiner—Vit W. Miska
Attorney, Agent, or Firm—Robert A. Pajak

[57] ABSTRACT

A system for operating a pair of microprocessors with independent system clocks while at the same time providing synchronization by a common interrupt signal, and in which the system clocks are cross-monitored to thereby provide Fail-Safe operation.

2 Claims, 2 Drawing Sheets

CROSS-MONITORED PAIR OF CLOCKS FOR PROCESSOR FAIL-SAFE OPERATION

BACKGROUND OF THE INVENTION

1. Field of the Invention

The invention disclosed herein broadly relates to microprocessor clock systems, and more particularly to a cross-monitored pair of clocks for operating a pair of microprocessors with Fail-Safe operation.

2. Description of Related Art

Fail-Safe operation of data processing systems is of paramount importance when such systems are employed for aircraft navigation and flight control. Commonly, aircraft applications require redundant systems as a means for cross-checking the navigation and/or flight control output. In those situations in which a pair of processors operate on the same input data, the intended output data of each of the processors should be identical, thereby verifying the integrity of the output data. If, of course, the output data of the independent processing systems are different, a failure is generally detected and a warning given to the pilot. This is so, since the pilot cannot determine which processor system is providing the "correct" output data.

Commonly, navigation and/or flight control systems generally employ a microprocessor for executing a fixed set of instructions requiring a fixed number of input clock cycles to execute these instructions. The total number of clock cycles to execute the fixed set of instructions is sometimes referred to as a frame. In order to provide independent redundancy, generally associated with each microprocessor is an independent system clock signal provided by a clock generator, commonly employing a high frequency oscillator.

When employing a pair of microprocessors, each having associated therewith an independent oscillator and a frame interrupt signal for reading output data, it is of paramount importance that the oscillator and the interrupt frame frequency be substantially identical and be provided by precision oscillators and/or clock generators. Even so, component degradation and/or environmentally induced variation in the frequency outputs thereof must be monitored in order to detect whether or not the microprocessors are operating in unison so that the output data can be relied upon. Thus, there is a need for a cross-monitored clock-pair system for Fail-Safe monitoring the clocking operation of the microprocessors, while at the same time maintaining independence.

SUMMARY OF THE INVENTION

An object of the present invention is to provide a cross-monitored clock-pair system which provides independent operation of a pair of microprocessor subsystems.

In accordance with the present invention, a first system clock generator provides a first system clock signal at a first system frequency and a second system clock generator for providing a second system clock signal at a second system frequency for independently operating first and second microprocessors, respectively. Associated with the first system clock generator, is a first frame clock generator responsive to the first system clock signal for deriving therefrom a first frame clock signal at a first frame frequency. Associated with the second system clock generator is a frame clock generator responsive to the second system clock signal for deriving therefrom a second frame clock signal at a second frame frequency, and a first reference clock signal at a first reference clock frequency.

Further associated with the first microprocessor subsystem is a first clock monitor having first and second inputs, where the first input receives the first frame clock signal, and the second input receives the first reference clock signal, where the first clock monitor provides an indication of whether or not the first and second system clock frequency are within prescribed limits relative to each other. If not, the first clock monitor provides an output indicative of a Fail-Safe error which may be operated on by subsequent subsystems for notification thereof.

Further, associated with the second microprocessor subsystem is a second clock monitor having first and second inputs where the first input receives the first frame clock signal, and the second input receives the first reference clock signal, such that the second clock monitor provides an output indicative of whether or not the first and second frame system clock frequencies are within prescribed limits relative to each other.

Since the first and second clock monitors derive information from clock signals from the primary system clocks of the two different processors, these monitors provide Fail-Safe operation.

DESCRIPTION OF THE PREFERRED EMBODIMENT

Figure 1:
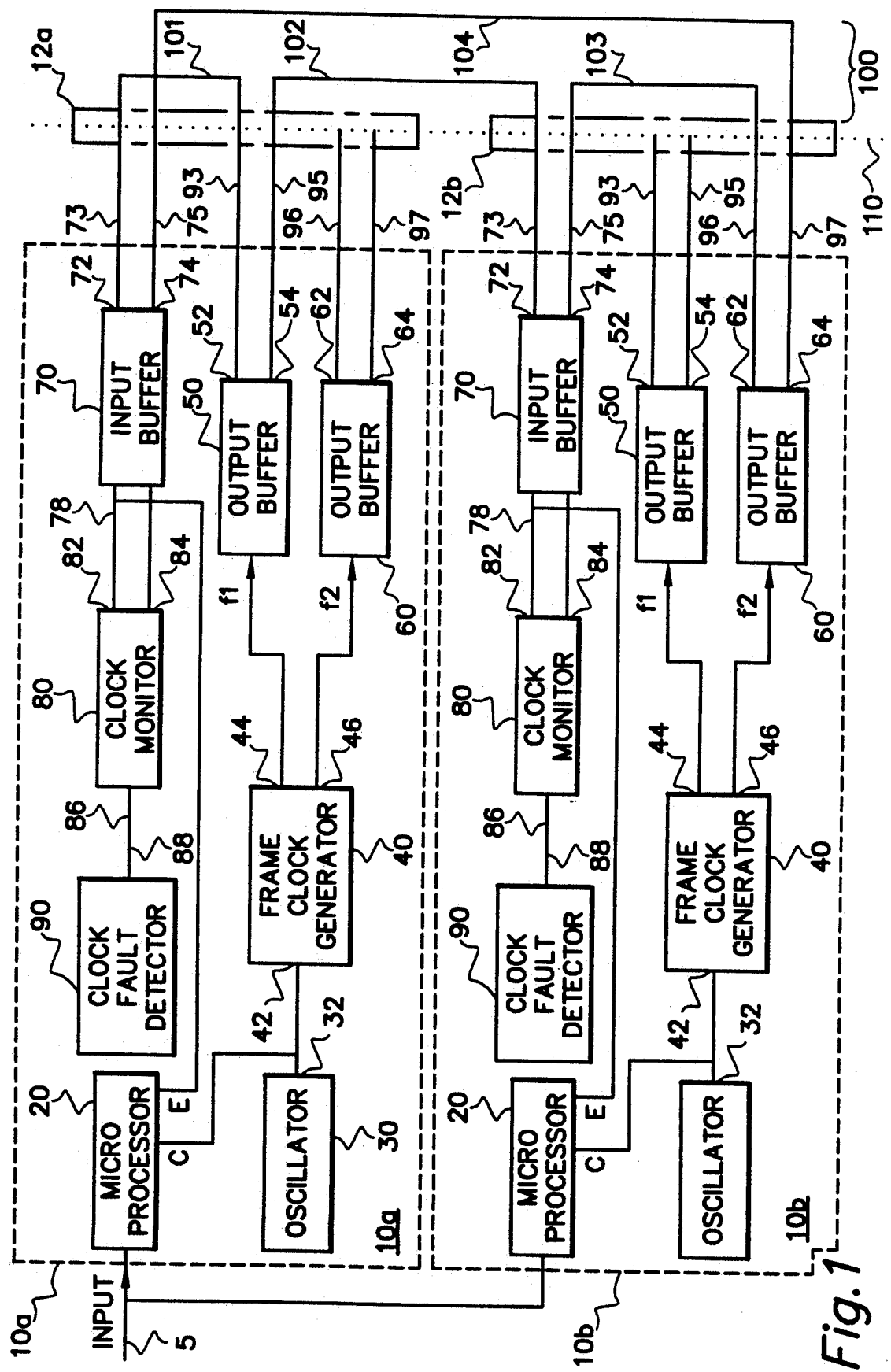
FIG. 1 is a block diagram of the cross-monitored clock pair system according to the present invention.

FIG. 1 illustrates the cross-monitored clock pair system in accordance with the present invention employed with a pair of microprocessors having common input data presented thereto. Thereshown, are two circuit card assemblies 10a and 10b having identical components serving in an identical manner and performing identical functions. Therefore, the components of circuit card assembly 10a will only be described.

Circuit card assembly 10a includes a microprocessor and the like, indicated by block 20, which receive input data 5 and provides output information (not shown). Microprocessor 20 includes a clock input "C" and enable input "E". Microprocessor 20 executes a set of programmed instructions in a well known manner. The instructions are performed at the system clock frequency of the system clock signal presented to microprocessor clock input "C", namely that provided by the system clock generator 30, for example a high frequency oscillator. Oscillator 30 provides a system clock signal at a first system frequency, for example, 18 megahertz, at the output 32 thereof. The output of oscillator 30 is electrically connected to the "C" input of microprocessor 20 and input 42 of frame clock generator 40.

Frame clock generator 40 provides at the output 44 thereof, a frame clock signal at a frame clock frequency ("f1"), and provides at the output 46 thereof a reference clock signal at a reference clock frequency ("f2"). Frame clock generator 40 may be constructed from a wide variety of digital circuits which provide output clock signals which are derived from the input clock signal. Such circuits may employ a digital counter and may also employ a digital logic circuit for providing a clock signal of a particular frequency derived from the input clock signal. For example, in one embodiment of the present invention, the system clock signal is 18 megahertz, the frame clock frequency is 100 hertz, and the reference clock frequency is 400 kilohertz. In these circumstances, frame clock generator 40 includes a divide by 45 circuit means to produce a 400 kilohertz signal, and a divide by 180,000 circuit means to produce a 100 hertz signal.

Again referring to FIG. 1, the frame clock signal at the output 44 is electrically connected as an input to an output buffer circuit 50. The reference clock signal at the output 46 is electrically connected to the input of output buffer 60. Output buffers 50 and 60 are connected to a digital signal buss and serve as isolation/amplification circuits in a well known manner. Each output buffer 50 and 60 provides a pair of signal lines 52 and 54, and 62 and 64 respectively, which in turn, may be electrically connected to a digital buss.

Circuit card assembly 10a further includes an input buffer 70, including separate input means 72 and 74, for receiving signals on signal lines 73 and 75 respectively. Signals on signal lines 73 and 75 are presented as input signals to a clock monitor 80, through input buffer 70. The signal on signal line 73 is electrically coupled to input means 82, and the E-input of microprocessor 20 on signal lines 78 and 79, respectively; and the signal on signal line 75 is electrically coupled to input means 84, both through buffer 70. Clock monitor 80 also includes an output means 86 for providing an output signal on signal line 88, presented as an input to clock fault detector 90.

Circuit card assemblies 10a and 10b may be of the variety intended to be plugged into a master interconnect board, sometimes referred to as a "mother board", of an electronic system chassis, or alternatively may be appropriately connected by a wiring harness having appropriate mating connectors for electrically connecting the circuit card assemblies to the wiring harness. Associated with each of these circuit card assemblies 10a and 10b is a corresponding circuit card connector 12a and 12b, respectively. In the preferred embodiment of the invention, these circuit card connectors are electrically interconnected in a manner as will now be described, and particularly illustrated in FIG. 1. As illustrated therein, the wiring interconnections between the circuit card connectors are generally designated by numeral 100, and the interface between the circuit card assemblies 10a and 10b and the corresponding circuit card connectors is indicated by the dotted line 110.

For purposes of understanding the present invention, circuit card assembly 10a is electrically connected to the circuit card connector 12a and is designated the primary microprocessor subsystem, and circuit card assembly 10b is connected to circuit card connector 12b, and is designated the secondary microprocessor subsystem. It should be noted that since the circuit card assemblies are identical, only their connection to the circuit card connectors 12a and 12b, and the wiring therebetween, establishes the primary and secondary designations.

The interconnections between circuit card connectors 12a and 12b as illustrated in FIG. 1 will now be described. Output means 52 of buffer 50 of circuit card assembly 10a is electrically connected to input means 72 of input buffer 70 of circuit card assembly 10a; and output means 54 of buffer 50 of circuit card assembly 10a is electrically connected to input means 72 of input buffer 70 of circuit card assembly 10b. Further, output means 62 of output buffer 60 of circuit card assembly 10b is electrically connected to input means 74 of input buffer 70 of circuit card assembly 10a; and output means 64 of output buffer 60 of circuit card assembly 10b is electrically connected to input means 74 of input buffer 70 of circuit card assembly 10b.

With this arrangement as just described, each microprocessor 20 on both circuit card assemblies 10a and 10b are provided with a common interrupt frame clock signal, and each monitor is cross checked with a common reference signal.

The function of clock monitor 80 is to provide an indication to the figuratively shown clock fault detector 90, or other subsystem, as to whether or not the system clock generator 30 and the frame clock generator 40 of both circuit card assemblies 10a and 10b are performing within a selected specification.

Figure 2:
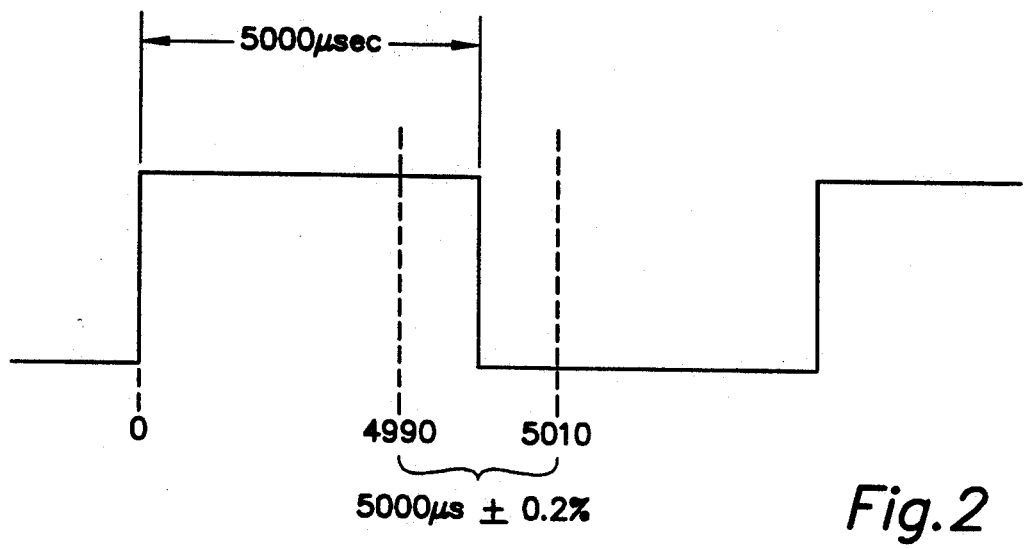
FIG. 2 is a timing diagram illustrating a frame clock signal.

Consider the situation where frame clock generator 40 of circuit card means 10a provides a frame clock signal of 100 hertz, and where frame clock generator 40 of circuit card 10b provides a reference clock signal at a frequency of 400 kilohertz, and that a fault detection is desired when the frame clock frequency is outside a ±0.2% window of its nominal value. This is particularly illustrated in the diagram illustrated in FIG. 2. Since typically the frame frequency enables the microprocessor during the first half of the frame clock frequency, only the edge of the clock signal is of importance, and thereof is of interest. As illustrated, the first half of a 100 hertz frame frequency is 5000 micro seconds. For a ±0.2% window, the first half of the 100 hertz signal must fall between 4990 and 5010 micro seconds, as illustrated. Therefore, it is desired that a clock fault detection should be indicated when the leading edge of the 100 hertz signal is either early, falling before 4990 micro seconds, or is to late, falling after 5010 micro seconds have elapsed from the leading edge of the 100 hertz signal.

Figure 3:
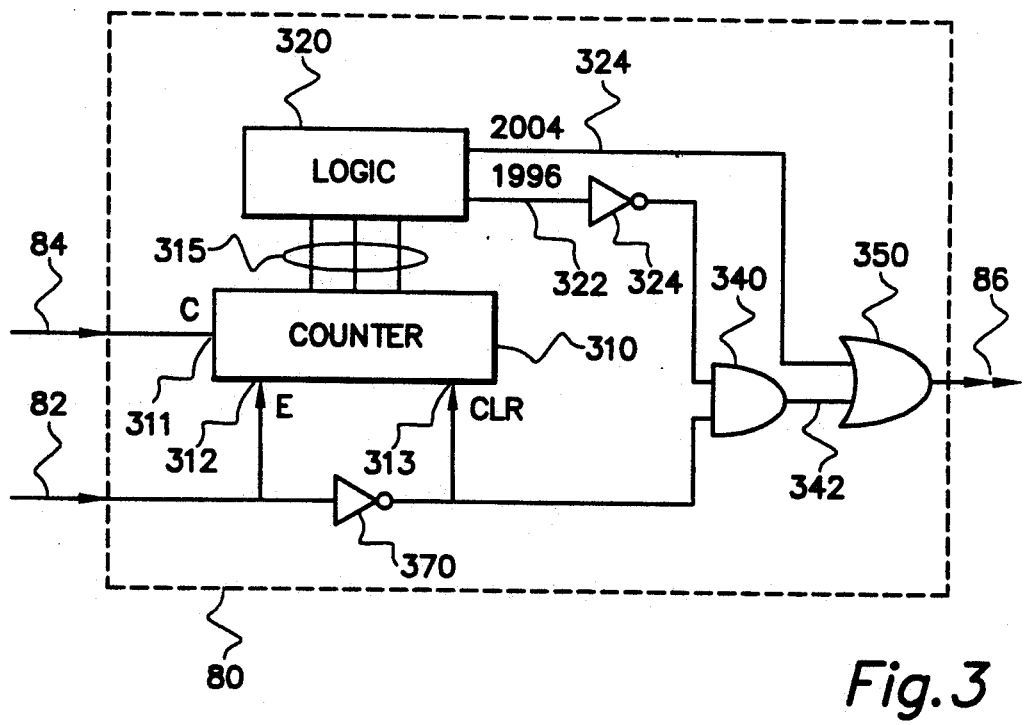
FIG. 3 is a block diagram illustrating one embodiment for a clock monitor in accordance with the present invention.

Clock monitor 80 is provided to accomplish the clock fault detection as just described. One example of an implementation for clock monitor 80 is illustrated in FIG. 3. Thereshown is a "counter" 310 having a clock input ("C") 311 receiving as an input signal the reference clock signal on signal line 84. Counter 310 further includes an enable input ("E") 312, and a clear input ("CLR") 313. The parallel output 315 of counter 310 includes a plurality of bits which are logically connected by logic means 320.

Logic means 320 includes a first output 322, and a second output 324. The output 322 is presented as a first input to AND circuit 340 through digital inverting circuit 324. The second input to AND circuit 340 is the output of digital inverting circuit 370, namely the inverted frame clock signal provided on signal line 82. The output 342 of AND gate 340 is presented as one input to OR circuit 350 providing logic output 86. The second input of OR circuit 350 is electrically connected to output 324 of logic means 320.

In the exemplary circuit for clock monitor 80 as just described, logic means 320 provides a logic "1" at output 322 thereof when counter 310 provides an output indicating a numerical equivalent of 1996. This, of course indicates that counter 310 has counted 1996 clock cycles of the 400 kilohertz reference clock frequency which has the timing equivalent of 4990 micro seconds. Similarly, logic means 320 provides a logic "1" at output 324 thereof when counter 310 provides an output indicating a numerical equivalent of 2004. This, of course indicates that counter 310 has counted 2004 clock cycles of the 400 kilohertz reference clock frequency which has the timing equivalent of 5010 micro seconds.

The operation of the circuit illustrated in FIG. 3 is such that when both the 400 kilohertz signal and the 100 hertz signal are within specification, the output of OR circuit 350 will continuously remain a logic 0, indicating a NO-FAULT clock condition. However, if the 100 hertz signal trailing edge falls before the 4990 micro seconds have elapsed, then AND circuit 340 will provide a logic level 1, and in turn OR circuit 350 provides a logic level 1, thereby indicating a clock fault condition at the output of OR gate 350. Similarly, if the trailing edge of the 100 hertz of frame frequency is too late, i.e. falling after 5010 micro seconds, then logic OR circuit 350 provides a logic level 1, again indicating a clock fault condition.

The logic circuit of FIG. 3 is such that AND gate 340 provides a logic level 1 only if counter 310 has not counted 1996 clock pulses, and that the frame clock signal has fallen to its low level. In turn, in this situation, OR gate 350 provides a signal indication of a fault of a fast frame clock frequency as referenced to the reference clock frequency. In contrast, if logic circuit 320 provides a logic level 1 at the output 324 thereof, it indicates that the trailing edge of the frame clock signal is late, since counter 310 was not reset before the count 2004 was reached. In this situation, OR gate 350 receives a logic level 1 input, and provides a logic level 1 output indicating again a clock fault condition, i.e., a late trailing edge of the frame clock signal as referenced to the reference clock frequency.

It should be noted that in the above discussion, that if the 100 hz frame clock frequency is perfect and the reference clock frequency is within ±0.2% of its intended 400 kilohertz frequency, there is no clock fault and therefore a no fault condition will be indicated. However, if the reference clock frequency is out of specification by the ±0.2% window, a clock-fault condition will be indicated. This is so since a faster system clock frequency by ±0.2% will cause the counter 310 to count 2004 in 5000 micro seconds, the upper limit before a clock fault condition. Similarly, a slower system clock frequency by −0.2% will cause the counter 310 to count 1996 in 5000 micro seconds, the lower limit before a clock fault condition. Therefore, with the limits selected in the exemplary embodiment as implemented by the logic circuit 320, the system clock frequencies must be within ±0.2% of each other. Of course, it should be recognized by those skilled in the art that other upper and lower tolerance limits by appropriate design of the counter 320 and logic means 320 are within the spirit and scope of the present invention.

It should be noted that with the wiring assembly 100, as illustrated in FIG. 1, which interconnects circuit card connectors 12a and 12b and corresponding circuit card assemblies 10a and 10b, each clock monitor 40 of each circuit card assembly receives as an input (84) to counter 310 the 400 kilohertz reference frequency provided by frame clock generator 40 of circuit card assembly 10b, and the 100 hertz input (82) provided by frame clock generator 40 of circuit card assembly 10a, as illustrated in FIG. 3. This cross coupling of circuit card assemblies provides a unique cross-monitored clock-pair system for providing Fail-Safe operation of the double redundant microprocessor data.

It should be recognized by those skilled in the art that circuit construction beyond that which has been disclosed herein falls within the true spirit and scope of the present invention. More specifically, a cross-monitored clock pair system has been illustrated for employment by subsequent subsystems for verifying the independent clock operation falling within predetermined limits so that information from the separate systems may be relied upon.

Although a specific embodiment has been shown for a clock monitor, as well as particular selected frequencies have been chosen, others are of course possible within the level of skill in the art, and are within the true spirit and scope of the present invention.

We claim:

1. A cross monitored clock system comprising:
   a first system clock generator for providing a first system clock signal at a first system frequency;
   a first frame clock generator responsive to said first system clock signal for deriving therefrom a first frame clock signal at a first frame frequency;
   a second system clock generator for providing a second system clock signal at a second system frequency;
   a second frame clock generator responsive to said second clock signal for deriving therefrom a first reference clock signal at a first reference frequency;
   a first clock monitor having first and second inputs, where said first input receives said first frame clock signal and said second input receives said first reference clock signal, said first clock monitor providing an indication of the value of said first frame clock frequency being either (i) within a first selected value range, or ii) outside said first selected value range;
   a second clock monitor having first and second inputs, where said first input receives said first frame clock signal and said second input receives said first reference clock signal, said second clock monitor providing an indication of the value of said first reference clock frequency being either (i) within said first selected value range, or ii) outside said first selected value range.

2. The cross monitored clock system of claim 1 wherein said second frame clock generator derives a second frame clock signal at a second frame clock frequency, and wherein said first frame clock signal provides a first interrupt signal to a first microprocessor which executes instructions in synchronization with said first system clock signal, and to a second microprocessor which executes instructions in synchronization with said second system clock signal.

* * * * *